US008805377B2

(12) United States Patent
Chami (10) Patent No.: US 8,805,377 B2
(45) Date of Patent: Aug. 12, 2014

(54) CONTROLLING RESELECTION FROM ACCESS POINTS IN A TELECOMMUNICATIONS NETWORK

(75) Inventor: Youssef Chami, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 302 days.

(21) Appl. No.: 12/736,981

(22) PCT Filed: May 28, 2009

(86) PCT No.: PCT/GB2009/050581
§ 371 (c)(1),
(2), (4) Date: Jan. 7, 2011

(87) PCT Pub. No.: WO2009/144501
PCT Pub. Date: Dec. 3, 2009

(65) Prior Publication Data
US 2011/0111759 A1 May 12, 2011

(30) Foreign Application Priority Data

May 28, 2008 (GB) .................................. 0809576.2

(51) Int. Cl.
*H04M 3/00* (2006.01)
*H04W 36/00* (2009.01)
*H04B 7/00* (2006.01)

(52) U.S. Cl.
USPC ........... 455/437; 455/418; 455/438; 455/524; 455/525; 370/332

(58) Field of Classification Search
CPC ..... H04W 48/20; H04W 36/36; H04W 36/38; H04W 4/00; H04W 36/00; H04W 40/00; H04W 24/00; H04M 3/00; H04M 1/00; H04B 7/00
USPC ............... 455/41.2, 67.11, 422.1, 434, 435.2, 455/436–444, 447–450, 453, 500, 515, 522, 455/524–526, 560–561, 418–420, 423–425, 455/435.1–435.3, 452.1–452.2, 550.1, 455/556.2; 370/252, 310, 313, 328, 338, 370/400, 401, 331–332, 341
See application file for complete search history.

(56) References Cited

U.S. PATENT DOCUMENTS 6,141,565 A * 10/2000 Feuerstein et al. ............ 455/560
(Continued)

FOREIGN PATENT DOCUMENTS

EP 1 835 780 9/2007
(Continued)

OTHER PUBLICATIONS

Nokia Siemens Networks et al, "E-UTRA Measurements and Cell Reselection Considerations," 3GPP TSG-RAN WG2 Meeting #58BIS, R2-072386, R2-071727, Orlando, Florida, USA, Jun. 25, 2007, 5 pp.

(Continued)

*Primary Examiner* — Meless Zewdu
(74) *Attorney, Agent, or Firm* — Muirhead and Saturnelli, LLC (57) ABSTRACT

A GSM or UMTS mobile telecommunications network is disclosed. In addition to the conventional radio access network comprising macro base station, one or more additional access points are provided. The access point is connected to the network core by an IP transport broadband connection. The access point is configured to appear to the mobile terminal as a conventional base station—that is, it communicates with the mobile terminal using GSM or UMTS transport protocols and does not require any modification to a standard GSM or UMTS mobile terminal. A subscriber may be provided with a designated "home" access point to provide coverage in their premises. Arrangements are described which will tend to reduce the likelihood that reselection to the macro base station while radio coverage is available from the home access point.

15 Claims, 5 Drawing Sheets

(56) References Cited

U.S. PATENT DOCUMENTS

| | | | |
|---|---|---|---|
| 6,788,952 B1* | 9/2004 | Jokimies et al. | 455/525 |
| 6,873,845 B2* | 3/2005 | Hanly | 455/436 |
| 6,978,138 B2* | 12/2005 | Japenga et al. | 455/436 |
| 7,031,266 B1 | 4/2006 | Patel et al. | |
| 7,110,765 B2* | 9/2006 | Amerga et al. | 455/436 |
| 7,822,413 B2* | 10/2010 | Brunner | 455/422.1 |
| 7,941,155 B2* | 5/2011 | Ji et al. | 455/453 |
| 2004/0022217 A1* | 2/2004 | Korpela et al. | 370/335 |
| 2005/0090278 A1* | 4/2005 | Jeong et al. | 455/525 |
| 2006/0199591 A1 | 9/2006 | Klatt | |
| 2007/0002759 A1* | 1/2007 | Diaz et al. | 370/252 |
| 2007/0213061 A1* | 9/2007 | Kim | 455/436 |
| 2008/0096560 A1 | 4/2008 | Felske et al. | |
| 2008/0096566 A1* | 4/2008 | Brunner et al. | 455/437 |
| 2008/0227453 A1* | 9/2008 | Somasundaram et al. | 455/436 |
| 2008/0253332 A1* | 10/2008 | Ore et al. | 370/331 |

FOREIGN PATENT DOCUMENTS

| | | | |
|---|---|---|---|
| EP | 1 835 780 A2 * | 9/2007 | H04Q 7/38 |
| GB | 2 313 740 | 12/1997 | |
| WO | WO 00/25547 | 5/2000 | |
| WO | WO 2008/047140 | 4/2008 | |
| WO | WO 2009/053710 | 4/2009 | |

OTHER PUBLICATIONS

ETSI TS 125 331 V8.2.0 (May 2008), Universal Mobile Telecommunications System (UMTS); Radio Resource Control (RRC); Protocol Specification (3GPP TS 25.331 version 8.2.0 Release 8), pp. 1-50, 578-583.

3GPP TS 25.304 V.8.1.0 (Mar. 2008), $3^{rd}$ Generation Partnership Project; Technical Specification Group Radio Access Network; User Equipment (UE) procedures in idle mode and procedures for cell reselection in connected mode (Release 8), 41 pp.

* cited by examiner

CONTROLLING RESELECTION FROM ACCESS POINTS IN A TELECOMMUNICATIONS NETWORK

TECHNICAL FIELD

This application relates to a base station reselection method for a mobile terminal camped on a predetermined cell, to a base station and to a telecommunications system.

BACKGROUND OF THE INVENTION

Conventional access to the features and services provided by GSM and UMTS networks involves signalling between the mobile terminal and a standard base station (macro base station) that has a dedicated connection to an MSC and provides coverage in the cell occupied by the mobile terminal using cellular telecommunication (e.g. GSM or UMTS) transport protocols. There have recently been proposals to allow access to the features and services provided by GSM and UMTS networks by providing additional special base stations (femto base stations), referred to as access points (APs), for example at a subscriber's home or office, in order to increase network capacity and improve coverage. These access points communicate with the core network via IP based communications, such as a broadband IP network, and are typically routed via the Internet.

Many different names have been given to APs, such as home access points (HAPs), micro-base stations, pico-base stations, pico-cells and femto-cells, but all names refer to the same apparatus. APs provide short range, localized coverage, and are typically purchased by a subscriber to be installed in their house or business premises.

It has also been proposed to use APs in the Long Term Evolution (LTE) telecommunications network currently being developed, but not yet implemented. LTE is likely to be the next network implementation after 3G.

An advantage of using an access point connected to the core network via an IP network is that existing broadband Digital Subscriber Line (DSL) connections can be used to link mobile terminals with the network core without using the capacity of the radio access network or transmission network of a mobile telecommunications network. In other words, the AP is integrated into a DSL modem/router and uses DSL to backhaul the traffic to the communication network.

A further advantage is that APs are able to provide mobile network access to areas where there is no radio access network coverage. Thus, they are expected to be particularly beneficial when installed in buildings with poor radio network coverage from the macro network but which have DSL connections. Additionally, an AP could provide UMTS coverage where there is no 3G coverage at all, perhaps only GSM coverage.

Currently, telecommunication network providers sometimes offer subscribers different call tariffs based on their location. For instance, one such service provides subscribers with cheaper tariffs when they use their mobile terminal in their home.

In one known implementation of such a system, upon a subscriber subscribing to a reduced tariff service, the core network identifies which base station(s), and hence which cell(s), provide coverage to the subscriber's home. These base stations are referred to as the subscriber's home base station(s). Each base station has a unique cell ID and the unique cell ID(s) of these home base station(s) are logged against the subscriber's profile. Therefore, when the subscriber is communicating on the mobile network and is located within his home, the subscriber's communication traffic should be routed from the home base station(s), through a Controller (e.g. a Radio Network Controller, RNC in 3G) and onward to the core network.

During the call set up procedure, the core network will receive the MSISDN of the subscriber and the cell ID of the base station with which the subscriber is communicating. In order to confirm at which rate to change the subscriber, the core network checks whether the subscriber is using one of the home base stations which cover his house. This check is made by consulting the Location Based Charging (LBC) Module and by comparing the MSISDN and cell ID identified in the call with those stored in the database. If the cell ID for the MSISDN is the ID of one of the subscriber's logged home base stations, the subscriber is recognised as calling from within his home and is charged at a reduced rate, otherwise he is charged at his standard rate.

With this in mind, APs provide another opportunity for network providers to offer reduced rates to subscribers. For instance, subscribers may benefit from a different call tariff when using their mobile terminal through an AP acting as a base station.

The present inventor has found that when a home base station (either an AP or a macro base station) is provided at a particular location, the subscriber's mobile device may select other base stations when at that location. This may happen, for example, if there is a nearby macro base station that perhaps in some parts of the AP's coverage area, for example the subscriber's, home provides better radio coverage/quality than the home base station.

Mobile networks such as 2G (GSM), 3G (UMTS) and LTE telecommunications networks have an active state of communication with their mobile terminals during which the device and network are exchanging user data, for example during a call or data exchange, and an inactive/idle state of communication with their terminals during which the terminal is not engaged in a call but takes regular network measurements and reports these to the network. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Handover and cell reselection are performed in the same way for APs as with macro base stations. It is desirable for mobile terminals to provide continuous service when moving within an SAE/LTE coverage area and between an SAE/LTE and a UMTS coverage area/2G coverage area, and to/from APs.

In a mobile network operating in accordance with the 3G (UMTS) Standards, a mobile terminal device (UE) has a so-called "RRC (Radio Resource Control) state" which depends on its state of activity. In the respective RRC states different functions for mobility are executed. These functions are described in technical specification 3GPP TS 25.304/25.331.

For 2G and 3G, a mobile terminal is in active communication when it has a CS (Circuit Switched) connection established.

In 2.5G, GPRS PS (Packet Switched), active communication can be defined as the GPRS Ready state. In 3G UMTS PS, active communication can be defined as the RRC connected mode state that is CELL-DCH.

In 3G UMTS PS, CELL/URA_PCH and CELL_FACH can be defined as inactive states. In GPRS, the Standby state can be regarded as an inactive state.

Either one or both of the CS and PS active communications may occur in the mobile terminal.

For a 3G mobile terminal, in the active mode the terminal is in the RRC connected mode. The RRC connected mode includes the following states:

CELL_DCH state is characterized by:
  A dedicated physical channel is allocated to the UE in uplink and downlink.
  The UE is known on cell level according to its current active set
  Dedicated transport channels, downlink and uplink (TDD) shared transport channels and a combination of these transport channels can be used by the UE.

CELL_FACH state is characterized by:
  No dedicated physical channel is allocated to the UE.
  The UE continuously monitors a FACH (forward access channel) in the downlink.
  The UE is assigned a default common or shared transport channel in the uplink (e.g. RACH) that it can use anytime according to the access procedure for that transport channel.
  The position of the UE is known by UTRAN on cell level according to the cell where the UE last made a cell update.
  In TDD mode, one or several USCH or DSCH transport channels may have been established.

CELL_PCH state is characterized by:
  No dedicated physical channel is allocated to the UE. The UE selects a PCH (paging channel) with the algorithm, and uses DRX for monitoring the selected PCH via an associated PCH.
  No uplink activity is possible.
  The position of the UE is known by UTRAN on cell level according to the cell where the UE last made a cell update in CELL_FACH state.

URA_PCH state is characterized by:
  No dedicated channel is allocated to the UE. The UE selects a PCH, and uses DRX for monitoring the selected PCH via an associated PCH.
  No uplink activity is possible.
  The location of the UE is known on UTRAN routing area level according to the URA assigned to the UE during the last URA update in CELL-FACH state.

In the CELL_DCH state a network-driven handover is performed when necessary, as described in 3GPP TS 25-331. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC on an event-driven basis, e.g. when the signal strength or signal-to-noise ratio of one of the cells exceeds a threshold. The information list is used by a handover algorithm implemented in the UTRAN RNC. The algorithm that determines when handover occurs is not specified in the GSM or UMTS Standards. The algorithms essentially trigger a handover when the mobile terminal provides a measurement of a neighbour cell received signal at the mobile terminal below a predetermined quality received threshold, which typically has a relation to the quality of the received signal from the serving cell (e.g. better quality by some margin).

In the "CELL_FACH", "CELL_PCH", "URA_PCH" or "idle mode" the mobile terminal controls its own mobility independently and starts a cell switch (reselection) when a neighbouring cell has a better quality than the current cell, as described in 3GPP TS 25.304. A similar procedure is also used in GSM/GPRS mobile networks, as described in technical specification 3GPP TS 05.08 (UE-based cell reselection).

In general, a mobile terminal in "idle mode" states and in RRC connected mode (inactive) states "CELL_FACH", "CELL_PCH" and "URA_PCH" performs periodic measurements of its own as well as of a series of neighbouring cells. Information from the neighbouring cells is broadcast in the system information block 11 (SIB11) or system information block 12 (SIB12) of the broadcast channel (BCH) as described in 3GPP TS 25.304 and 3GPP TS 25.331.

In order to avoid a cell reselection/switch based on short-term changes in the radio field conditions, so-called "fading", and the subsequent return to the original cell, a UMTS system mainly uses two parameters that are emitted in the Broadcast Channel (BCH) in the system information block 3 (SIB3) or system information block 4 (SIB4). Notably, these are the time interval "Treselection" and the hysteresis value "Qhyst". In order to avoid too fast a switch between cells based on quickly changing network conditions, a switch from the original cell to the neighbouring cell only takes place if the neighbouring cell was better than the original cell by the factor "Qhyst" for the time "Treselection". This behaviour of a mobile end device is described in detail on the technical specification 3GPP TS 25.304. Multiple frequency layers and mobility state determination are provided in a similar manner for LTE/SAE networks.

When a subscriber is at their home location, the reselection measurements continue to be made in the normal way and cell reselection may occur. When a base station other than the home base station is selected, this is unsatisfactory for several reasons. Firstly, if the home base station is an AP, the capacity of the macro network will be used unnecessarily. Secondly, the subscriber will not receive the discounted "home" rate when using a base station other than the macro network. This is a particular problem as the subscriber is unlikely to be aware of which base station is selected. Therefore, it is preferable to keep the subscriber on their AP rather than for their terminal to reselect to a macro cell.

One solution would be to increase the power of the home base station but this has the disadvantages of increasing interference to neighbouring base stations and reducing bandwidth.

Accordingly, it would be desirable to provide an alternative solution, without these disadvantages.

SUMMARY OF THE INVENTION

According to a first aspect of the system described herein, there is provided a base station reselection method for a mobile terminal camped on a predetermined base station, which mobile terminal performs a cell reselection function in accordance with reselection parameters, the method including determining the radio characteristics of at least one neighbouring base station and selectively varying the reselection parameters in dependence upon the determined radio characteristics of the neighbouring base station to alter the likelihood that the neighbouring base station will be selected by the mobile terminal.

The arrangement may be such that the predetermined base station may be selected for longer without having to increase its power.

The predetermined base station may be a "home" macro base station or "home" access point (femtocell).

The method may further include determining the radio characteristics of the predetermined cell with respect to the mobile terminal.

When the determined radio characteristics of the neighbouring cell are better than a threshold, the reselection parameters may be varied to alter the likelihood that the neighbouring base station will be selected by the mobile terminal. In the embodiment, when the determined characteristics of the neighbouring cell are better than a threshold and the determined characteristics of the predetermined cell are better than a threshold, the reselection parameters are varied to make it less likely that the neighbouring base station will be selected by the mobile terminal. That is, in this scenario, the predetermined/home base station is made "more attractive" or "more sticky" to the mobile terminal. The mobile terminal is instructed to begin measurements for cell reselection later (when the predetermined base station is of lower coverage/quality than is conventionally the case). Conversely, in the embodiment, when the predetermined characteristics of the neighbouring cell are better than a threshold and the determined characteristics of the predetermined cell are worse than a threshold, the reselection parameters are varied to make it more likely that the neighbouring base station will be selected by the mobile terminal. That is, in this scenario, the home base station is made "less attractive" or "less sticky". The mobile terminal will begin making measurements for performing cell reselection at a higher coverage/quality level of the predetermined base station than conventionally.

The determined radio characteristic may be coverage, e.g. RSCP, and/or quality, e.g. Ec/Io.

The reselection parameters may comprise a threshold of the quality of the predetermined base station, below which the mobile terminal measures the radio characteristics of the neighbouring base station for the purpose of making a reselection decision. Conventionally, such a threshold is typically fixed. For example, in 3G, the threshold may be "sintersearch" or "sintrasearch". If the quality of the predetermined cell is above sintersearch, then the mobile terminal will not measure the inter-frequency cells while camped. If the quality of the serving cell is above sintrasearch, then the mobile terminal will not measure other intra-frequency cells while camped. In the embodiment, by varying the sintersearch and/or sintrasearch values, the likelihood that reselection to a neighbouring cell will occur can be adjusted.

The reselection parameters may alternatively or additionally comprise an amount by which the radio characteristics of the neighbour base station must be better than those of the predetermined base station before reselection by the mobile terminal occurs. For example, the reselection parameters may comprise a hysteresis value. The mobile terminal only performs reselection to the neighbouring cell if the neighbouring cell is better than the predetermined cell by this hysteresis factor for a particular time, for example. In 3G this reselection parameter may be Qoffset1 or Qoffset2. In the embodiment, by varying the amount by which the radio characteristics of the neighbour base station must be better than those of the predetermined base station, the likelihood of reselection to the neighbour base station can be adjusted.

The determination of the radio characteristic may be performed by the predetermined base station. Alternatively, the determination of the radio characteristics may be performed by the mobile terminal and reported to the predetermined base station.

The predetermined base station may vary the reselection parameters and transmit these to the mobile terminal as "system information".

In the embodiments, only the reselection parameters of a mobile terminal registered for use with the predetermined base station are adjustable. For example, the predetermined base station may be the registered "home" base station for the particular mobile terminal.

The reselection parameters may apply to both inter and intra carrier reselection, and may comprise "sintersearch" and "sintrasearch" parameters.

The system described herein also relates to a base station and to a telecommunications system.

BRIEF DESCRIPTION OF THE DRAWINGS

Embodiments of the system described herein will now be described by way of example, with reference to the accompanying drawings, in which.

DETAILED DESCRIPTION OF VARIOUS EMBODIMENTS

Figure 1:
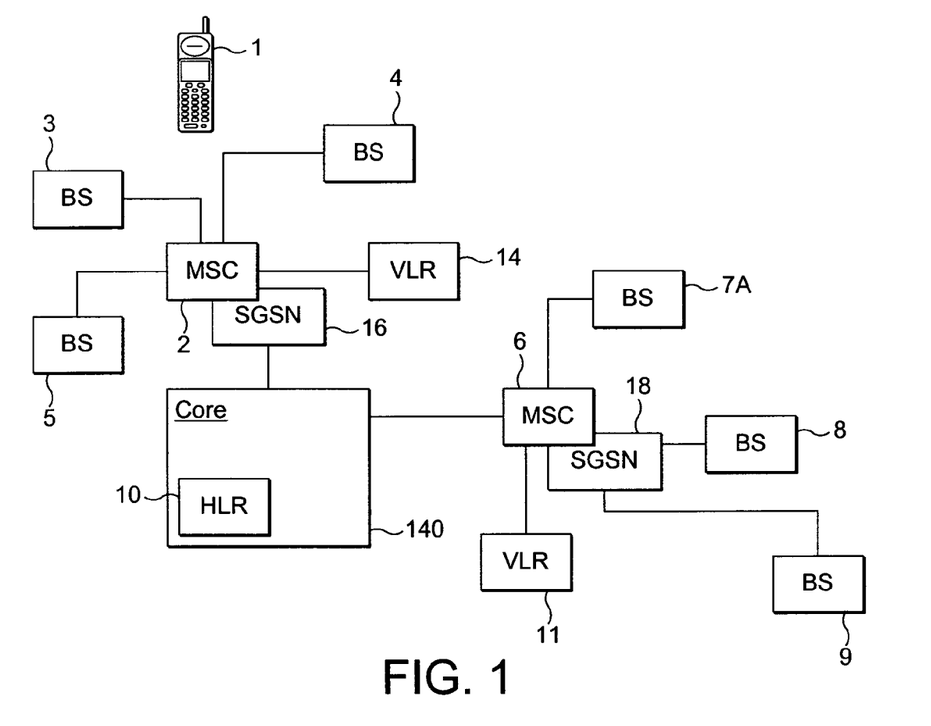
FIG. 1 is a diagrammatic drawing of elements of a mobile telecommunications network that may be used in accordance with an embodiment of the system described herein.

Certain elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7A, 8 and 9. In practice, the network will incorporate many more MSCs and base stations than shown in FIG. 1. The base stations 3, 4, 5, 7A, 8 and 9 each have dedicated (not shared) connection to their MSC 2 or MSC 6—typically a cable connection. This prevents transmission speeds being reduced due to congestion caused by other traffic.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated SIM card) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 140 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the system described herein may be implemented.

Figure 2:
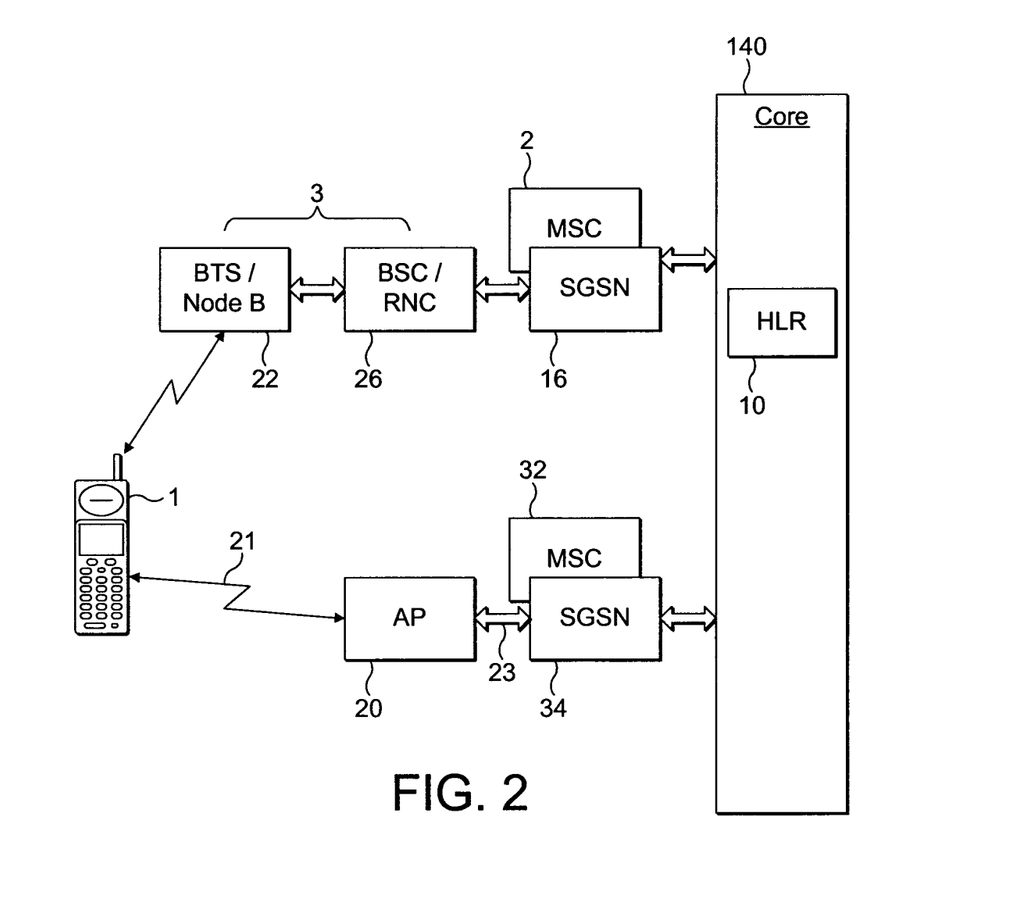
FIG. 2 shows a modified mobile telecommunications network for receiving IP based communications from an access point in addition to communications from a conventional base station that may be used in accordance with an embodiment of the system described herein.

FIG. 2 shows elements for providing access to a GSM or UMTS network by both a conventional base station 3 and an access point (AP 20). The AP 20 communicates with the mobile terminal 1 via a radio link 21.

In the embodiments, the radio link 21 between the AP 20 and the mobile terminal 1 uses the same cellular telecommunication transport protocols as the conventional base station 3 but with a smaller range—for example 25 meters. The AP 20 appears to the mobile terminal 1 as a conventional base station, and no modification to the mobile terminal 1 is required to operate with the AP 20. The AP 20 performs a role corresponding to that of a GSM BTS 22 and BSC 26 and/or UMTS Node B and RNC and/or an LTE eNode B.

Communications 23 between the access point 20 and the core network 140 are IP based communications, and may be, for example, transmitted over a broadband IP network (and routed via the Internet). The communications are routed via MSC 32 or SGSN 34. The access point 20 converts the cellular telecommunications transport protocols used for signalling in conventional GSM or UMTS networks used between the mobile terminal 1 and the AP 20 to IP based signalling.

The connection 23 between the access point 20 and the core network 140 may use the PSTN telephone network. Typically a DSL cable connection connects the access point 20 to the PSTN network. The data is transmitted between the access point 20 and the core network 140 by IP transport/DSL transport (a backhaul connection).

The access point 20 may be connected to the core network 12 by means other than a DSL cable and the PSTN network. For example, the access point 20 may be connected to the core network 140 by a dedicated cable connection that is independent of the PSTN, or by a satellite connection between the access point 20 and the network core 140.

Using an access point 20 connected to the core network via an IP network does have advantages. Existing broadband DSL connections can be used to link mobile terminals with the network core 140 without using the capacity of the mobile telecommunications network radio access network, or where there is no conventional radio access network coverage. For example, UMTS coverage could be provided by an access point 20 where there is no conventional UMTS coverage (perhaps only GSM coverage).

AP 20 may be configured to serve a WLAN located in a home or office, in addition to GSM/UMTS/LTE networks. The WLAN could belong to the subscriber of the mobile terminal 1, or be an independently operated WLAN.

The owner of AP 20 can program the AP so that it is either "open" or "closed", whereby an open AP is able to carry communications from any mobile device in the GSM/UMTS network, and a closed AP is only able to carry communications from specific pre-designated mobile devices. Arrangements for controlling use of APs by mobile devices are disclosed in WO-A-2008 047140 ("Allowed AP").

With this background in mind, a first embodiment of the system described herein will now be described in relation to FIG. 3.

Figure 3:
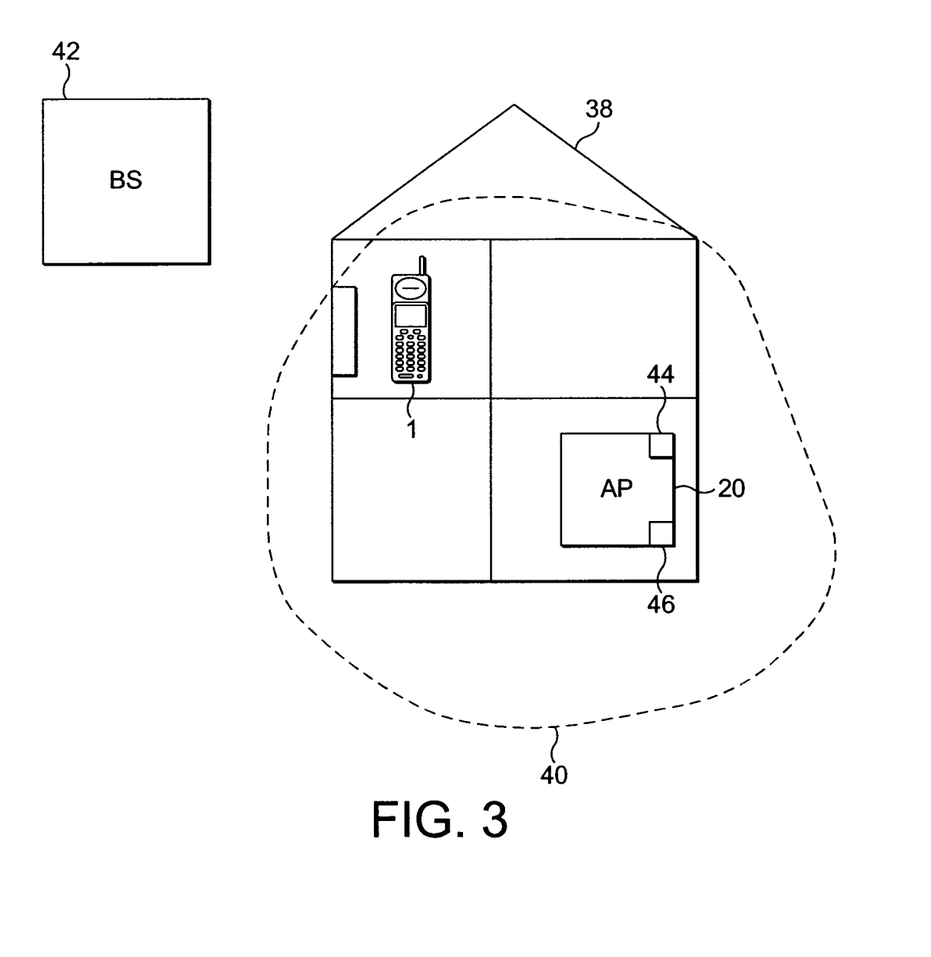
FIG. 3 shows an access point located in a subscriber's premises that is also served by a conventional base station in accordance with an embodiment of the system described herein.

FIG. 3 shows an AP 20 installed in the subscriber's home or workplace 38. The coverage area, indicated by dashed line 40 of the AP 20 will typically be smaller than that of macro base station 42 but generally will be sufficient to cover the whole area of the premises 38. Generally one or more macro base stations, including macro base station 42 as in FIG. 3, will also cover the premises.

The AP 20 is connected to a DSL line at the premises 38. All communications from the AP 20 are transmitted along the DSL and to an Internet Service Provider (ISP). Typically, the ISP will receive communications from multiple APs, and so will include a Digital Subscriber Line Access Multiplexer (DSLAM) and a data switch, for multiplexing a plurality of customer communications and routing them to an MSC/SGSN.

In idele mode, and when the mobile terminal is camped on the AP, if the power and/or quality of the radio signal received at the mobile terminal 1 for the home AP 20 becomes relatively low then the cell reselection process is triggered. In this process the power and/or quality of the neighbouring base stations (including base station 42) is evaluated in the manner described above. If a neighbouring base station provides improved radio quality, then the reselection process can be completed in a conventional manner, also briefly described above.

The following parameters are used to control the reselection process:

Sintersearch

The Sintersearch information element is described in 3GPP TS 25.331 and 3GPP TS 25.304, and is sent in SIB3. Sintersearch controls whether the mobile device 1 must make measurements of inter-frequency cells while camped on a particular "serving cell". If the quality of the serving cell is above Sintersearch, then the UE will not measure other inter-frequency cells while camped.

The Sintersearch value is conventionally the same for all base stations (including APs) in a network.

Sintrasearch

The Sintrasearch information element is described in 3GPP TS 25.331 and 3GPP TS 25.304, and is sent in SIB3. Sintrasearch controls whether the mobile terminal 1 must make measurements of intra-frequency cells while camped. If the quality of the serving cell is above Sintrasearch, then the UE will not measure other intra-frequency cells while camped.

The Sintrasearch value is conventionally the same for all base stations (including APs) in a network.

Quality Measure

The 3GPP TS 25.331, "Cell selection and reselection quality measure" information element may be RSCP (Received Signal Code Power) and/or the ratio Ec/No (the ratio of the energy per chip, Ec, received by the mobile terminal to the spectral noise power density, No, received by the mobile terminal 1, with allowance made for non-orthognobility).

Hysteresis 1 (Qhyst1 or Qoffset1)

Qhyst1 (see 3GPP TS 25.331) specifies the hysteresis value to be used by the mobile device 1 if the Quality Measure is CPICH RSCP. Reselection of a neighbouring cell only takes place if the neighbouring cell is better in coverage than the home AP20 by the factor Qoffset1 for a predetermined time ("Treselection").

Hysteresis 2 (Qhyst2 or Qoffset 2)

Qhyst2 (see 3GPP TS 25.331) specifies the hysteresis value to be used by the mobile device 1 if the Quality Measure is CPICH Ec/Io. Reselection of a neighbouring cell only takes place if the neighbouring cell is better in quality than the home AP20 by the factor Qoffset2 for a predetermined time ("Treselection").

In accordance with an important feature of the embodiment, Sintersearch, Sintrasearch, Qoffset 1 and Qoffset 2 may be varied for the mobile terminal 1 while the home AP 20 is selected.

The effect of varying these values is as follows: —

Sintrasearch
    When this value is increased by the AP 20, the mobile terminal 1 starts intra-frequency cell reselection earlier (i.e. when the quality of the serving cell is higher than conventionally).
    When this value is decreased by the AP 20, the mobile terminal starts infra-frequency cell reselection later (i.e. when the quality of the serving cell is lower than conventionally).

Sintersearch
    When this value is increased by the AP 20, the mobile terminal 1 starts inter-frequency cell reselection earlier (i.e. when the quality of the serving cell is higher than conventionally).
    When this value is decreased by the serving cell, the mobile terminal starts inter-frequency cell reselection later (i.e. when the quality of the serving cell is lower than conventionally)

Qoffset 1(s,n); applies to R (reselection) rule with CPICH RSCP
    When this value is increased by the serving cell, the mobile terminal 1 has a lower probability of selecting a neighbouring cell.
    When this value is decreased by the serving cell, the mobile terminal 1 has a higher probability of selecting a neighbouring cell.

Qoffset2(s,n): applies to R (reselection) rule with CPICH Ec/Io
    When this value is increased by the serving cell, the mobile terminal 1 has a lower probability of selecting a neighbouring cell.
    When this value is decreased by the serving cell, the mobile terminal 1 has a higher probability of selecting a neighbouring cell.

Offset 1 and 2 are only used together with the Sintersearch parameter for the interfrequency mobility. The parameters Qoffset1 and 2 are unchanged for the infrafrequency case. However, the network operator may choose to change these parameters to ease the idle mode mobility from the femto cell to neighbouring 3G macro base station on the different carrier in case of high interference.

The home AP 20 includes a detector module 44 for measuring RSCP and/or Ec/Io of the neighbouring base stations (including macro base stations and other APs) which use the same carrier or a different carrier when the Sintersearch and Sintrasearch parameters so indicated. In further embodiments the RSCP and/or Ec/Io parameters may be measured at the mobile device and may then be reported to the AP.

The home AP 20 is also aware of the RSCP and/or Ec/Io between itself and mobile terminal 1. The home AP 20 is therefore able to characterise its RSCP and/or Ec/Io with respect to the mobile terminal as "high" or "low".

The AP20 is also able to characterise the RSCP and/or Ec/Io of the neighbouring base stations on the same carrier and on a different carrier as "high" or "low" (at the location of the AP20).

The home AP20 includes programming means 46. In dependence of these characteristics, the home AP 20 operates the programming means 46 to then instruct the mobile terminal 1 to adjust the parameters Sintersearch, Sintrasearch, Qoffset1 and Qoffset2 in the manner summarised in the table below.

| | Measured Ec/Io and/or RSCP of Current Home base station | Measured Ec/Io and/or RSCP of Targeted 3G Femto or Macro cell on Same Carrier | Measured Ec/Io and/or RSCP of Targeted 3G Femto or Macro cell on Different Carrier | Sinter-Search | Sintra-Search | Qoffset1* | Qoffset2* |
|---|---|---|---|---|---|---|---|
| 1 | Low | Low | High | ↑ | ↔ | ↓ | ↓ |
| 2 | Low | High | Low | ↔ | ↑ | ↔ | ↔ |
| 3 | Low | Low | Low | ↔ | ↔ | ↔ | ↔ |
| 4 | High | Low | High | ↓ | ↔ | ↑ | ↑ |
| 5 | High | High | Low | ↔ | ↓ | ↔ | ↔ |
| 6 | High | High | High | ↓ | ↓ | ↑ | ↑ |

↔ Parameter value stays

↑ Parameter value goes up

↓ Parameter value goes down

Note:
*The Qoffset1 & 2 maybe left unchanged if the SinterSearch value is aggressively reduced. Each of the above parameters can be used in isolation or a in conjunction with other parameters.

Based on the measured cell information (Ec/Io and/or RSCP values), in accordance with the table, the following actions are performed:

If a neighbouring cell coverage/quality is "high" and the home AP 20 coverage/quality is "high" then home AP 20 modifies cell selection and reselection parameters to make the home AP 20 look "more attractive" to the mobile and broadcasts them through system information to the mobile terminal 1.

In row 4 of the Table the home AP20 coverage/quality is "high", the coverage/quality of the neighbouring cell on a different carrier is also "high" and the coverage/quality of the neighbouring cell on the same carrier is "low". When this occurs, the sintersearch value is reduced which, as indicated above causes the mobile terminal 1 to start inter-frequency cell reselection measurements later. Moreover, the decision to reselect the macro cell can be delayed by increasing the Qoffset1 and Qoffset2. Reselection will therefore generally (though not necessarily) occur later. In Row 4 the sintrasearch value remains unchanged.

In row 5, the coverage/quality of the AP 20 is "high", the coverage/quality of the neighbouring cell on the same carrier is "high" and the coverage/quality of the neighbouring cell on a different carrier is "low". The sintrasearch value is reduced which, as indicated above, results in the mobile terminal starting intra-frequency cell reselection measurements later and therefore generally (though not necessarily) performs cell reselection later. In Row 5 the sintersearch value remains unchanged. The Qoffset1 and Qoffset 2 values are unchanged. Further, in Row 5, the decision to perform the cell re-selection to the neighbouring macro cell can be delayed using a variable Parameter (PCompensation) as introduced in 3GPP 25.331

In row 6 of the above Table the coverage/quality of the home AP 20 is "high", as is the coverage/quality of the neighbouring cell on the same carrier and on a different carrier. In column 6 both sintersearch and sintrasearch are decreased, which means that the mobile terminal starts inter-frequency and intra-frequency cell reselection measurements later. Qoffset 1 and Qoffset2 are increased so that the mobile terminal has a lower probability of selecting a neighbouring cell on a different carrier.

If the neighbouring cell coverage/quality is "high" and home AP 20 coverage/quality is "low", the home AP 20 modifies the cell selection and reselection parameters to make the home AP 20 look "less attractive" to the mobile 1 and broadcasts them through system information to the mobile terminal 1. The SinterSearch and SintraSearch values are increased to cause the mobile terminal to start measuring the surrounding 3G macro cells earlier and/or the Qoffset1/2 values are reduced to make reselection by the mobile more likely.

In row 1 of the above Table the coverage/quality of the home AP 20 is "low", the coverage/quality of the neighbouring cell on a different carrier is "high" and the coverage/quality on the same carrier is "low". The sintersearch value is increased so that the mobile terminal starts inter-frequency cell reselection measurements earlier. Qoffset1 and Qoffset are reduced to speed up the reselection process to neighbouring inter frequency macro cell. The Sintrasearch value remains unchanged.

In row 2 of the above Table the coverage/quality of the home AP 20 is "low", the coverage/quality of the neighbouring cell on the same carrier is "high" and the coverage/quality on the different carrier is "low". The sintrasearch value is increased so that intra-frequency cell reselection measurements are started earlier, so that it is more likely that a cell reselection will occur. Qoffset1, Qoffset2 and Sintersearch values remain unchanged.

No other actions will be required for the remaining conditions.

In row 3 of the above Table the coverage/quality of the home AP 20, the neighbouring cell on the same carrier and the neighbouring cell on a different carrier are all "low". The value sintersearch, sintrasearch, Qoffset1 and Qoffset2 remain unchanged.

Figure 4:
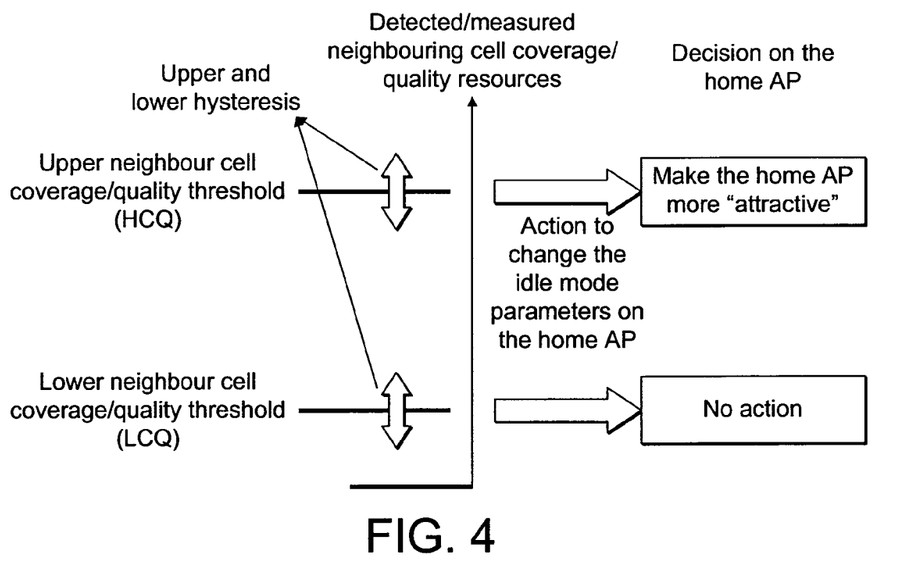
FIG. 4 shows how reselection parameters on a home access point are varied in dependence upon the neighbouring cell coverage/quality in accordance with an embodiment of the system described herein.

As shown in FIG. 4, the home AP 20 continuously detects the neighbouring cell information (whether measured by the AP directly or whether it is measure by the mobile terminal and reported to the AP) and compares the average measurement results (moving window or time based average) with pre-configured thresholds that are conventionally used in idle mode by the mobile terminal 1 for reselection, that is, coverage/quality level upper threshold (HCQ) and lower threshold (LCQ) that are specific for the AP 20. If the home AP 20 has a "high" coverage/quality level with the mobile terminal 1, when detected cell coverage/quality of the neighbour cell is higher than upper threshold (HCQ) plus hysteresis (i.e. the coverage/quality of the home AP20 and neighbouring cell are characterised as "high", as in the table above), it is decided to take an action to modify the idle mode parameters values of the mobile terminal 1 as appropriate. When the home AP has a "low" coverage/quality level with the mobile terminal 1, when detected cell coverage/quality of the neighbour cell is higher than the upper threshold (HCQ) plus hysteresis (i.e. the coverage/quality of the home AP is "low", as in the table above, and the coverage/quality of the neighbouring cell is "high", as in the table above), it is decided to take an action to modify the idle mode parameters of the mobile terminal 1. When detected/measured cell coverage/quality of the neighbouring cell is lower than the lower threshold (LCQ) plus hysteresis, it is decided to take no further action.

Figure 5:
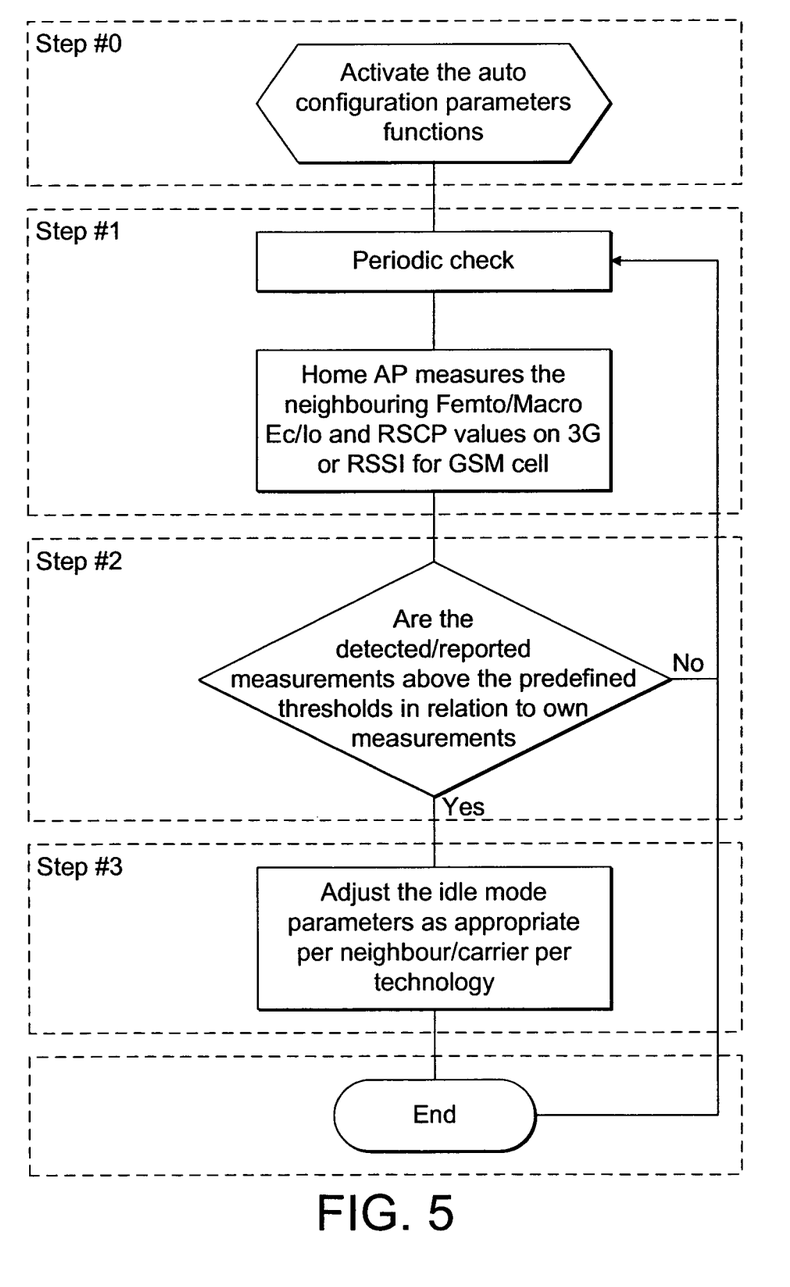
FIG. 5 shows a high-level flow chart of the steps performed to provide adaptive reselection in accordance with an embodiment of the system described herein.

The procedure is also summarised in the high-level flow chart of FIG. 5.

At step O an auto-configuration function of the home AP 20 is activated.

At step 1 a periodic check is performed during which the home AP 20 measures the neighbouring base station (Femtocells, macrocells etc.) Ec/Io and RSCP values on 3G (or RSSI for GSM).

At step 2 it is determined whether the measurements are above predetermined thresholds relative to the Ec/Io and RSCP values measured by the home AP 20 for communications between the home AP 20 and the mobile terminal 1. If the measurements are not above the predetermined thresholds, then the process returns to step 1 for performance of the periodic check.

However, if the measurements are above the predetermined thresholds, then in step 3 the idle mode parameters of the mobile terminal 1 are adjusted in accordance with the principles described above. Control is then returned to step 1 and the periodic checking is performed.

In the table and description above, when it is indicated that a parameter (sintersearch, sintrasearch, Qoffset1 and/or Qoffset2) stays the same, that parameter may be set to the value set conventionally. When it is indicated that a parameter goes up in value, that parameter may be set to a predetermined value that is a predetermined amount more than the conventional value. Similarly, when a parameter value is decreased, that parameter value may be set to a predetermined value that is a predetermined value less than a conventional value. Therefore, there may be only three predetermined values for each of sintersearch, sintrasearch, Qoffset1 and Qoffset2. A predetermined "increased" value, a predetermined "decreased value" and a predetermined "conventional" value.

Various modifications to the embodiment described are possible.

For example, in the embodiment the home AP 20 measures the Ec/Io and/or RSCP of neighbouring base stations. In an alternative arrangement, the Ec/Io and/or RSCP measurements of the neighbouring base stations may be measured by the mobile terminal 1 and reported to the home AP 20. This is advantageous in that the measurements of the neighbouring cells at the mobile terminal 1 are gathered, which are more relevant to the reselection procedure than the coverage/quality measurements at the home access point 20. However, the disadvantage of this is that the mobile terminal 1 must be operated to perform the measurements, which will consume power and therefore reduce battery life, and would also require additional signalling between the mobile terminal 1 and the home access point 20.

In the embodiment when the measurements are made in the mobile terminal, the intelligence for deciding how to vary the cell reselection parameters may be located in the AP or in the terminal.

In the embodiment the base station at the subscriber's premises is an access point (AP). The invention is also applicable where a particular macro base station is designated as a "home" base station. In this context, an advantage is provided because the subscriber tends to have the "home" base station selected when at his premises, and therefore benefits from a favourable charging rate.

In embodiments in which the AP is a 'closed AP', i.e. only available for communication with subscribers who are pre-designated to use it, the parameters are adjusted for pre-designated subscribers only.

It will be clear to those skilled in the art that the invention provides the advantage that when the mobile terminal is in idle mode and is camped on an access point that cell reselection parameters are controlled in order to keep the device camped on the AP. This provides the user with the benefits of using the access point, for example reduced charging, while providing the network with the benefit of directing traffic off the macro network.

Of course any changes in the re-selection parameters should be made at a level that provide the mobile terminal, should it become active, with sufficient network coverage from the AP to be able to make and receive calls or other communications at its current location through the AP.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A base station reselection method for a mobile terminal camped on a predetermined base station, which mobile terminal performs a cell reselection function in accordance with reselection parameters, the method comprising:
   determining radio characteristics of at least one neighbouring base station;
   determining radio characteristics of the predetermined base station with respect to the mobile terminal; and
   selectively varying the reselection parameters to determine when the mobile terminal begins making cell reselection measurements for the cell reselection function in dependence upon the determined radio characteristics of the neighbouring base station with respect to a first threshold and in dependence upon the determined radio characteristics of the predetermined base station with respect to a second threshold, wherein the selective varying of the reselection parameters thereby alters the likelihood that the neighbouring base station will be selected by the mobile terminal.

2. The method of claim 1, wherein the method is performed when the mobile terminal is in idle mode.

3. The method of claim 1, wherein the predetermined base station comprises a Femtocell.

4. The method of claim 1, wherein, when the determined radio characteristics of the neighbouring base station are better than the first threshold and are better than the determined radio characteristics of the predetermined base station by a specified value, varying the reselection parameters to make it more likely that the neighbouring base station will be selected by the mobile terminal.

5. The method of claim 1, wherein, when the determined radio characteristics of the neighbouring base station are better than the first threshold and the determined radio characteristics of the predetermined base station are better than the second threshold, varying the reselection parameters to make it less likely that the neighbouring base station will be selected by the mobile terminal.

6. The method of claim 1, wherein, when the determined radio characteristics of the neighbouring base station are better than the first threshold and the determined radio characteristics of the predetermined base station are worse than the second threshold, varying the reselection parameters to make it more likely that the neighbouring base station will be selected by the mobile terminal.

7. The method of claim 1, wherein only the reselection parameters of a mobile terminal registered for use with the predetermined base station are adjustable.

8. A base station that controls a reselection method of a mobile terminal camped on the base station, which mobile terminal performs a cell reselection function in accordance with reselection parameters, the base station comprising:
- a first determining module that determines radio characteristics of at least one neighbouring base station;
- a second determining module that determines radio characteristics of the predetermined base station with respect to the mobile terminal; and
- a mobile terminal programming module that selectively varies the reselection parameters of the mobile terminal to determine when the mobile terminal begins making cell reselection measurements for the cell reselection function in dependence upon the determined radio characteristics of the neighbouring base station with respect to a first threshold and in dependence upon the determined radio characteristics of the predetermined base station with respect to a second threshold, wherein the selective varying of the reselection parameters thereby alters the likelihood that the neighbouring base station will be selected by the mobile terminal.

9. The base station claim 8, wherein the method is performed when the mobile terminal is in idle mode.

10. The base station of claim 8, wherein the predetermined base station comprises a Femtocell.

11. The base station of claim 8, wherein the programming module, when the determined radio characteristics of the neighbouring base station are better than the first threshold and are better than the determined radio characteristics of the predetermined base station by a specified value, is configured to vary the reselection parameters to make it more likely that the neighbouring base station will be selected by the mobile terminal.

12. The base station of claim 8, wherein the programming module, when the predetermined characteristics of the neighbouring base station are better than the first threshold and the determined characteristics of the base station are better than the second threshold, is configured to vary the reselection parameters to make it less likely that the neighbouring base station will be selected by the mobile terminal.

13. The base station of claim 8, wherein the programming module, when the predetermined characteristics of the neighbouring base station cell are better than the first threshold and the determined characteristics of the base station are worse than the second threshold, is configured to vary the reselection parameters to make it more likely that the neighbouring base station will be selected by the mobile terminal.

14. A telecommunications system, comprising:
- a mobile terminal;
- a first base station that controls a reselection method of the mobile terminal camped on the base station, which mobile terminal performs a cell reselection function in accordance with reselection parameters, wherein the first base station includes:
- a first determining module that determines radio characteristics of at least one neighbouring base station;
- a second determining module that determines radio characteristics of the predetermined base station with respect to the mobile terminal; and
- a mobile terminal programming module that selectively varies the reselection parameters of the mobile terminal to determine when the mobile terminal begins making cell reselection measurements for the cell reselection function in dependence upon the determined radio characteristics of the neighbouring base station with respect to a first threshold and in dependence upon the determined radio characteristics of the predetermined base station with respect to a second threshold, wherein the selective varying of the reselection parameters thereby alters the likelihood that the neighbouring base station will be selected by the mobile terminal.

15. A non-transitory computer readable medium storing computer software for a reselection method for a mobile terminal camped on a predetermined base station, which mobile terminal performs a cell reselection function in accordance with reselection parameters, the computer software comprising:
- executable code that determines the radio characteristics of at least one neighbouring base station;
- executable code that determines radio characteristics of the predetermined base station with respect to the mobile terminal; and
- executable code that selectively varies the reselection parameters to determine when the mobile terminal begins making cell reselection measurements for the cell reselection function in dependence upon the determined radio characteristics of the neighbouring base station with respect to a first threshold and in dependence upon the determined radio characteristics of the predetermined base station with respect to a second threshold, wherein the selective varying of the reselection parameters thereby alters the likelihood that the neighbouring base station will be selected by the mobile terminal.

* * * * *